United States Patent
Rothschild

(10) Patent No.: US 8,010,131 B2
(45) Date of Patent: Aug. 30, 2011

(54) SYSTEM AND METHOD FOR ENABLING SOCIAL INTERACTIVE WIRELESS COMMUNICATIONS

(76) Inventor: Leigh M. Rothschild, Sunny Isles, FL (US)

( * ) Notice: Subject to any disclaimer, the term of this patent is extended or adjusted under 35 U.S.C. 154(b) by 429 days.

(21) Appl. No.: 12/283,910

(22) Filed: Sep. 16, 2008

(65) Prior Publication Data
US 2010/0069058 A1    Mar. 18, 2010

(51) Int. Cl.
*H04W 74/00* (2009.01)
(52) U.S. Cl. ........... 455/456.3; 455/414.1; 455/414.2; 455/414.3; 455/456.1; 455/457
(58) Field of Classification Search .... 455/414.1–414.3, 455/456.1–457, 459
See application file for complete search history.

(56) References Cited

U.S. PATENT DOCUMENTS

| | | | |
|---|---|---|---|
| 6,618,593 B1 * | 9/2003 | Drutman et al. | 455/456.3 |
| 2005/0181803 A1 * | 8/2005 | Weaver et al. | 455/456.1 |
| 2005/0250552 A1 * | 11/2005 | Eagle et al. | 455/567 |
| 2006/0052057 A1 * | 3/2006 | Persson et al. | 455/41.2 |
| 2006/0234631 A1 * | 10/2006 | Dieguez | 455/41.2 |
| 2007/0124721 A1 * | 5/2007 | Cowing et al. | 717/100 |
| 2007/0282621 A1 * | 12/2007 | Altman et al. | 705/1 |
| 2008/0086261 A1 * | 4/2008 | Robinson et al. | 701/200 |
| 2008/0140650 A1 * | 6/2008 | Stackpole | 707/5 |
| 2009/0082038 A1 * | 3/2009 | McKiou et al. | 455/456.6 |

* cited by examiner

*Primary Examiner* — Jinsong Hu
*Assistant Examiner* — Dung Hong
(74) *Attorney, Agent, or Firm* — Cuenot, Forsythe & Kim, LLC

(57) ABSTRACT

A computer-implemented system and method for enabling social interactive wireless communication between at least two mobile devices is presented. In particular, the system and method comprises affiliating and/or synchronizing a first mobile device and a second mobile device with an interactive social network. Further, the present invention comprises associating at least one first social interactive pairing criterion with the first mobile device, and associating at least one second social interactive pairing criterion with a second mobile device. Upon disposition of the first and second mobile devices in a physical and/or geographic proximity to one another, the present invention further comprises determining whether the first and second social interactive pairing criterion at least partially coincide with one another, and establishing a communication channel between the first and second mobile devices for communication therebetween.

24 Claims, 5 Drawing Sheets

SYSTEM AND METHOD FOR ENABLING SOCIAL INTERACTIVE WIRELESS COMMUNICATIONS

BACKGROUND OF THE INVENTION

1. Field of the Invention

The present invention is directed to a system and method for enabling social interactive wireless communication between at least two mobile devices, for instance, upon disposition of the wireless devices in a physical and/or geographic proximity to one another.

2. Description of the Related Art

As the sophistication of mobile technology continues to increase, more individuals are using mobile devices to accomplish everyday tasks, including, but certainly not limited to, e-mail, web browsing, text messaging, and/or task management. Of course, many of these mobile devices may also serve as wireless and/or cellular telephones. In addition, many mobile devices include locational software and/or mechanisms, such as global positioning systems ("GPS") to estimate and/or locate the particular device's location.

In addition, social networking via the World Wide Web, such as via social networking websites including MYSPACE®, FACEBOOK®, LINKEDIN®, and/or dating websites including EHARMONY® or MATCH.COM®, continues to evolve and affect many individuals and entities of today's society. While many individuals are associated with a variety of "contacts" and/or "friends" within these social networking and/or dating websites, it would be beneficial to be advised when the individual is in a physical and/or geographic proximity to one or more "friends" or "contacts" and be able to communicate therewith via their respective mobile devices. It would also be beneficial to locate certain prospective dating and/or social matches who are disposed in a physically proximate location. This would facilitate communication therebetween and perhaps establish a long-time relationship.

Accordingly, there is a current need in the art of mobile technology for a system and/or method of synchronizing or affiliating one or more mobile devices with an interactive social network and enabling social interactive wireless communication therebetween, for example, upon disposition of the mobile devices in a physical and/or geographic proximity to one another.

SUMMARY OF THE INVENTION

The various embodiments of the present invention are related to a computer-implemented system and/or method for enabling or facilitating social interactive wireless communication between at least two mobile devices. In particular, the mobile devices may comprise virtually any portable, mobile, or easily transportable device equipped with the various structures and/or software applications so as to facilitate the practice of the present invention in the intended manner, as will be apparent from the description provided herein.

At least one embodiment of the present invention comprises synchronizing and/or affiliating the one or more mobile devices, such as a first and second mobile device, with an interactive network, such as, for example, an interactive social network, social networking website(s), dating service(s), affinity groups, etc. Furthermore, the present invention comprises associating at least one first and second interactive or social interactive pairing criterion with the first and second mobile devices, respectively. The first interactive pairing criteria may correspond with a desired prospective match, and may include for instance, certain physical features of the desired prospective match. The second interactive pairing criteria may include, for instance, a pre-established profile associated with a user of the second device.

Accordingly, at least one embodiment of the present invention further comprises disposing the first and second mobile devices in a physical and/or geographic proximity to one another, and determining whether the first and second social interactive pairing criterion at least partially coincide with one another. Specifically, if the physical features associated with a prospective match identified by the user of the first mobile device at least partially corresponds or coincides with the profile of the user associated with the second mobile device, then, in at least one embodiment, a communication channel is established therebetween. The respective users may then communicate with one another via the first and second mobile devices.

In yet another embodiment, the first and second mobile devices are synchronized or affiliated with a social networking website, such as, for example, MYSPACE®, FACEBOOK®, LINKEDIN®, etc. The first and second social interactive pairing criteria may thus be associated with a "friend" or "contact" list within the social networking website. As such, upon disposition of the first and second mobile devices in a physical and/or geographic proximity to one another, if the users are "friends" or "contacts" within the social networking website, a communication channel between the mobile devices may automatically and/or upon selective confirmation by the users, be established.

These and other objects, features and advantages of the present invention will become clear when the drawings as well as the detailed description are taken into consideration.

BRIEF DESCRIPTION OF THE DRAWINGS

For a more complete understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
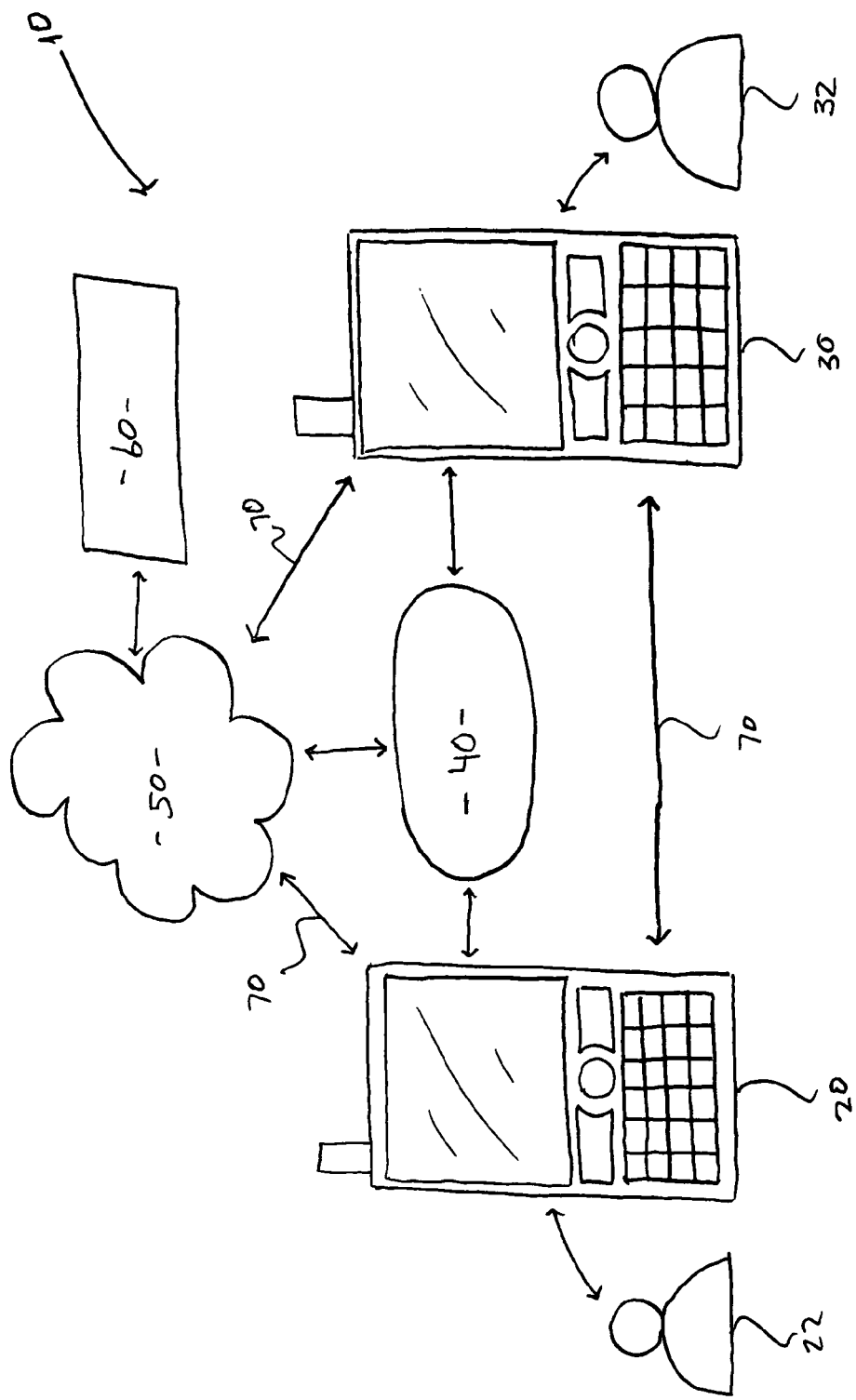
FIG. 1 is a schematic representation of at least one embodiment of the system for enabling social interactive wireless communication as disclosed in accordance with the present invention.
Figure 2:
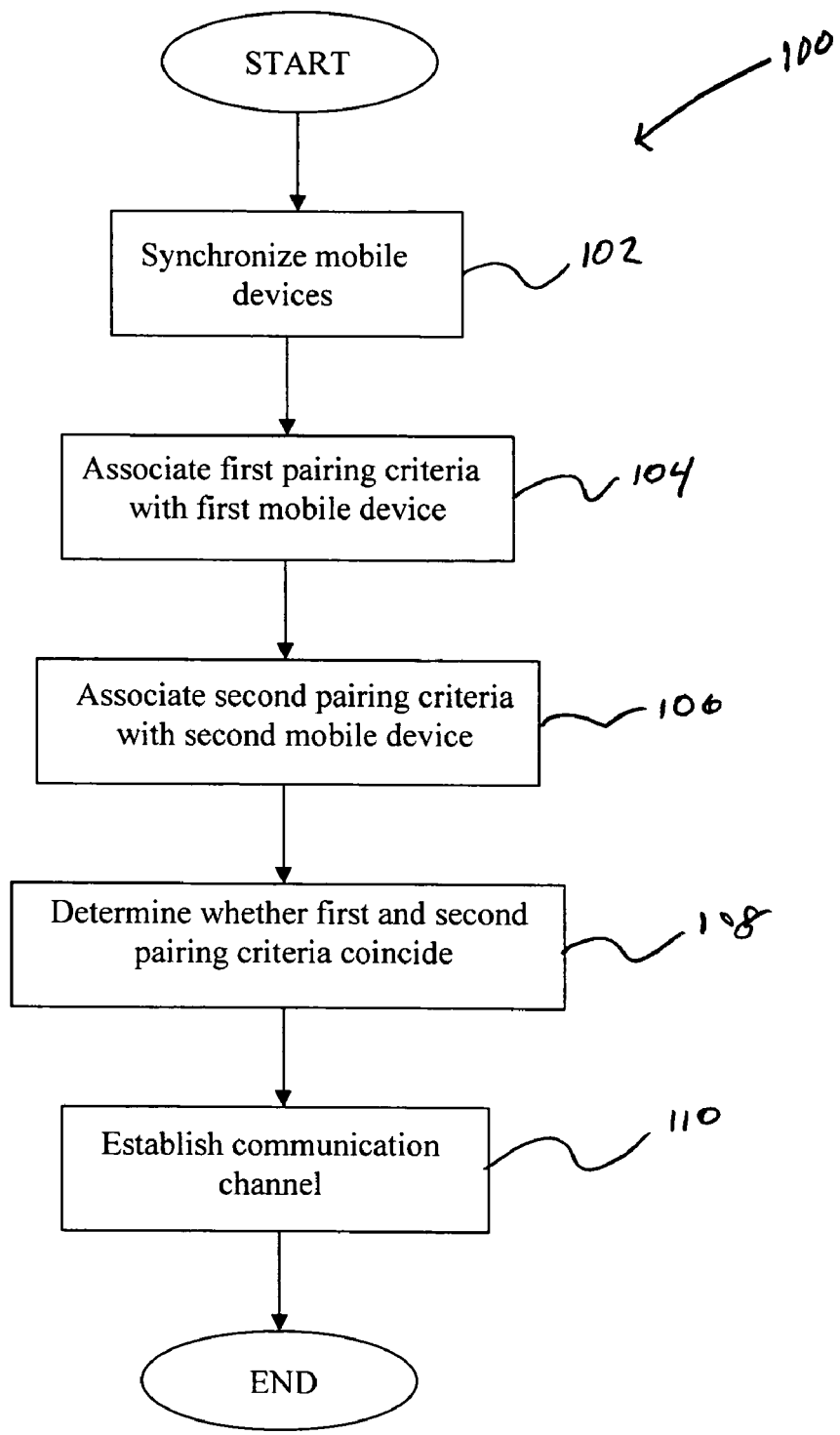
FIG. 2 is a flow chart illustrating at least one embodiment of the method for enabling social interactive wireless communication as disclosed in accordance with the present invention.
Figure 3:
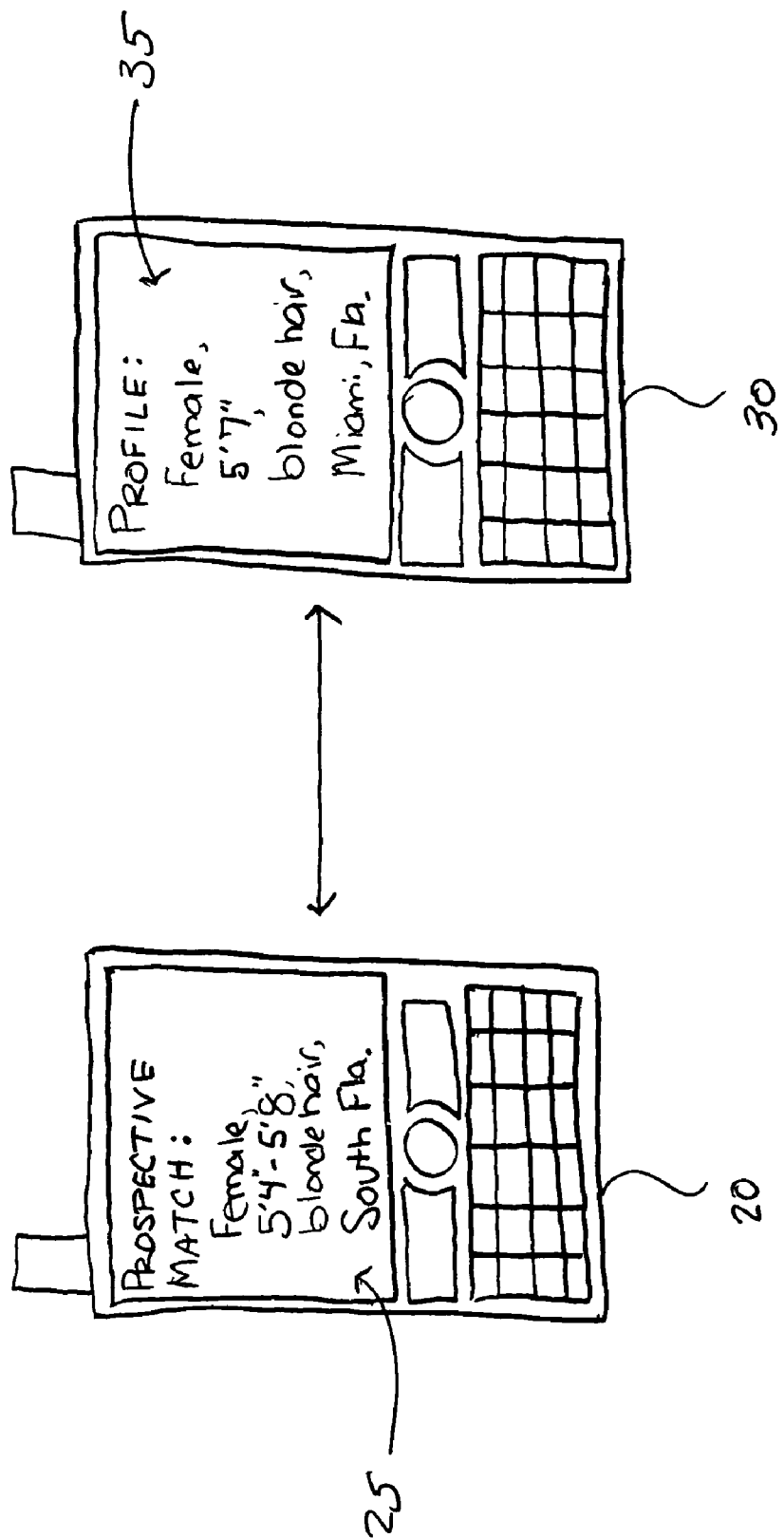
FIG. 3 is a schematic representation of a first and second mobile device comprising coinciding first and second social interactive pairing criteria.

The present invention is directed to a system, generally indicated as 10, and method, generally indicated as 100, for enabling or facilitating interactive wireless communication between at least two mobile devices 20, 30 and/or the respective users 22, 32 thereof. In particular, the various embodiments of the present invention comprise at least one first mobile device 20 and at least one second mobile device 30 disposable in a physical and/or geographic proximity relative to one another.

The first and second mobile devices 20, 30 of the various embodiments of the present invention may comprise virtually any device or structure which is movable, portable, and/or can otherwise be easily carried or transported by a user 22, 32 thereof and which is further structured to facilitate the practice of the present invention in the intended manner, as described in detail herein. As such, the first and second mobile devices 20, 30 may include, but are certainly not limited to, a cellular telephone, personal digital assistant ("PDA"), portable video game console, portable media player, pager, digital and/or wireless camera, etc.

Moreover, in at least one embodiment of the present invention, the first and second mobile devices 20, 30 are structured to synchronize with, or otherwise be affiliated with, an interactive network 40, as generally illustrated at 102. As will become apparent from the following discussion, the interactive network 40 of the various embodiments of the present invention may include, for example, an interactive social network, social networking website(s), dating service(s), dating website(s), affinity groups, etc., such as, MYSPACE®, FACEBOOK®, EHARMONY®, a college fraternity, a group of friends, the United States Army, or any other network comprising a plurality of users and/or members associated or registered therewith. Particularly, in at least one embodiment, synchronizing and/or affiliating the first and second mobile devices 20, 30 with the interactive network 40 comprises a user 22, 32 of the respective mobile device 20, 30 to opt into the interactive network 40, by, for instance, registering, downloading, installing, and/or linking with the interactive network 40. Upon doing so, as will be explained in greater detail below, in at least one embodiment, a first interactive or social interactive pairing criterion 25 is associated with the first mobile device 20, as generally indicated at 104, and a second interactive or social interactive pairing criterion 35 is associated with the second mobile device 30, as generally indicated at 106. More in particular, and as will become apparent from the discussion herein, the first and second interactive pairing criteria 25, 35 are structured and disposed to at least partially define a match or other communicative or pairing relationship between the respective first and second mobile devices 20, 30.

Further, at least one embodiment of the present invention comprises at least one social network server 60 which is structured to store, manage, or control the interactive network 40 of the present invention. A user 22, 32 of the first and/or second mobile devices 20, 30 of at least one embodiment may thus register or develop a profile 42 with the interactive network 40 by communicating certain profile information to the social interactive server 60. The profile information may include, for example, the user's name, age, sex, occupation, salary or income, education, one or more selected affinity groups, as well as one or more physical features, including height, weight, eye color, hair color, etc. Of course, the profile information may include digital media such as photographs, videos, audio files, etc.

In addition, the user 22, 32 of one or more mobile devices 20, 30 may also or instead upload or communicate to the social interactive server 60 certain information pertaining to a desired or prospective social match, such as, for instance, certain physical features or other similar profile information which the user 22, 32 desires a social match to comprise, including age, sex, occupation, income level, location, etc. In at least one embodiment, the first and second social interactive pairing criterion 25, 35 associated with the first and second mobile devices 20, 30 identified above are defined to include the prospective match information and/or the profile information, which may be stored on the social interactive server 60 and/or the corresponding user's 22, 32 mobile device 20, 30.

In at least one embodiment wherein the first and/or second social interactive pairing criterion 25, 35, such as for instance the profile information and/or prospective match information identified above, is stored or contained on the social interactive server 60, as will be described below, the first and second mobile devices 20, 30 may communicate with one another via the server 60, at least for purposes of developing a match and/or establishing a communication channel 70 therebetween. For example, the server 60 may automatically, and/or upon selective confirmation by the users 22, 32, detect the location of the respective mobile devices 20, 30, and determine whether there is a match. The server 60 may send notifications, confirmations, etc. to the respective devices 20, 30, for example, via text message, e-mail, pop-up, voice call, etc., in connection with the same.

In at least one embodiment wherein the first and/or second social interactive pairing criterion 25, 35 is stored or contained on the corresponding first and/or second mobile devices 20, 30, however, the mobile devices 20, 30 may communicate directly with one another, such as via a peer-to-peer, Bluetooth network, cellular, satellite, infrared, or other wireless network, for example, and completely bypass use of or a need for the social interactive server 60. This feature may be important and/or convenient when or if the mobile devices 20, 30 are not able to connect with a server 60, and/or are otherwise out of range of the server 60, satellite, cellular tower, or other communication or connection structure. As such, the first and/or second mobile devices 20, 30 of at least one embodiment are equipped or configured to detect the presence of proximately disposed other mobile devices 20, 30, and determine whether there is a match therebetween. Of course at least some or all of the social interactive pairing criterion 25, 35 may be disposed or stored on the devices 20, 30 themselves while communication therebetween is processed and/or developed thorough the server 60.

In particular, in at least one embodiment, the mobile devices 20, 30 include software or executable applications which are structured to facilitate the practice of the present invention in the intended manner without the need or use of a social interactive server 60. Specifically, the user 22, 32 of the mobile device(s) 20, 30 may enter certain profile information and/or prospective match information directly into the device 20, 30 itself, such as via typing, voice command, transfer from a computer, etc. Accordingly, the mobile devices 20, 30 comprise corresponding software and/or hardware structured to facilitate practice of the present invention independent of and without the need for a social interactive server 60.

Furthermore, upon disposition of the first and second mobile devices 20, 30 in a physical and/or geographic proximity to one another, the present invention includes determining whether there is a match therebetween, or otherwise determining whether the first and second social interactive pairing criteria 25, 35 coincide with one another, as generally indicated at 108. Particularly, in at least one embodiment, the first and/or second social interactive pairing criteria 25, 35 may include, and a user 22, 32 of the mobile device(s) 20, 30 may specify or indicate, a maximum, minimum, or preferred distance or range in which to communicate with another mobile device 20, 30. For instance, the user 22, 32 may indicate on the device 20, 30 itself, on the social interactive server 60, during registration with the interactive social network 40, etc., a preferred distance from another device 20, 30 in which to communicate with, for instance, five (5) feet or one (1) mile. Of course, the distance may be preset by the software, application, and/or server 60 and thus, in at least one embodiment, unable to be modified by a user 22, 32.

Specifically, in at least one embodiment, the mobile devices 20, 30 are equipped with certain locational mechanisms and/or software, such as global positioning system(s) ("GPS") in order for the mobile devices 20, 30 and/or the server 60 to detect or estimate the mobile devices' 20, 30 location. Of course, the server 60 and/or other structure may use certain algorithms or triangulation calculations in order to determine or estimate the location of the one or more mobile device(s) 20, 30 of the present invention.

Either way, as indicated above, once the devices 20, 30 are disposed in a physical and/or geographic proximity to one another, for instance, in the same room, party, wedding, meeting, etc., the present invention includes determining whether the first and second social interactive pairing criterion 25, 35 coincide with one another, as at 108. In particular, the mobile devices 20, 30 may, in at least one embodiment, be configured by the corresponding user 22, 32 to be disposed in a communicating mode so as to either detect or be detected by other mobile devices 20, 30. In such an instance, the particular mobile device 20, 30 may be attempting to search and/or filter for other proximately disposed devices 20, 30, and/or be configured as being available or in a broadcasting mode in order to be detected by other devices 20, 30. Particularly, in at least one embodiment, the user 22, 32 of a mobile device 20, 30 may notify the social interactive server 60 via the device 20, 30 that he/she desires to place the mobile device 20, 30 in the communicative mode. The server 60 and/or the software disposed thereon may thus be configured to locate the mobile device(s) 20, 30 and search for other mobile device(s) 20, 30 disposed in a proximate location thereto. In at least one embodiment, however, and as mentioned above, the mobile devices 20, 30 are equipped with hardware and/or software or otherwise configured to detect or be detected by other mobile devices 20, 30 independent of any server 60. As such, the mobile devices 20, 30 may utilize wireless communications, Bluetooth, infrared, cellular technology or other mechanisms to communicate, detect, and/or be detected.

It should be apparent that at least one mobile device 20, of the present invention, may be structured and configured to be disposed in a communicative relation with one or a plurality of second mobile devices 30 in the manner as described in detail herein. In particular, the first mobile device 20 of at least one embodiment may be structured and configured to simultaneously, selectively, or successively communicate with one or more second mobile devices 30 disposed in a proximate relation thereto. In addition, the first mobile device 20 may be configured or programmed to be disposed in a communicative relation with a certain predetermined or selected maximum number of second mobile devices 30.

Furthermore, in at least one embodiment, the first social interactive pairing criteria 25 comprises a selective characteristic of an individual or user associated with a prospective wireless match. The selective characteristic(s) may include, for example, physical, locational, emotional, or personality type characteristics. In addition, the second social interactive pairing criteria 35 associated with the second mobile device 30 may comprise a pre-established or predefined profile associated with the user 32 thereof. Specifically, the profile may be stored on the second mobile device 30 itself and/or one or more social interactive servers 60, as described above.

In particular, and for exemplary purposes only, the first social interactive pairing criteria 25 associated with the first mobile device 20 may essentially represent that the user 22 thereof is searching for a 25 to 30 year old female individual, between 5'4" and 5'8", blonde or brown hair, living in South Florida. If the second social interactive pairing criterion 35 associated with the second mobile device 30 includes a pre-established or pre-defined profile which coincides therewith, or represents, for example, a 28 year old, 5'6", blonde female, living in Miami, Fla., at least one embodiment of the present invention would determine that the first and second social interactive pairing criteria 25, 35 coincide with one another, assuming that each of the respective devices 20, 30 are configured to be in the communicative mode, as described above. Of course, the various embodiments of the present invention include certain predefined software algorithms which are structured to determine a match. The algorithms of the various embodiments may weigh certain attributes or profile information more heavily than others and/or only compare certain pre-specified attributes.

Furthermore, in at least one embodiment, upon disposition of the first and second mobile devices 20, 30 in the physical or geographic proximity with one another, and/or upon determining a match therebetween, the second social interactive pairing criteria 35, such as, for example, the profile associated with the user 32, is communicated to the first mobile device 20. Upon its receipt, the user 22 of the first mobile device 20 may selectively confirm or deny whether to establish a communication channel therewith. Similarly, in at least one embodiment, the first social interactive pairing criteria 25, such as the prospective match information, and/or a profile associated with the user 22 of the first mobile device 20 may be communicated to the second mobile device 30. Upon its receipt, the user 32 of the second mobile device 30 may selectively confirm or deny whether to establish a communication channel therebetween. It should be noted that, in at least one embodiment, the entire profile associated with the first and/or second mobile device 20, 30 may be communicated to the other device 20, 30 for review thereof. However, certain information may be withheld upon the corresponding user's 22, 32 request.

Figure 5:
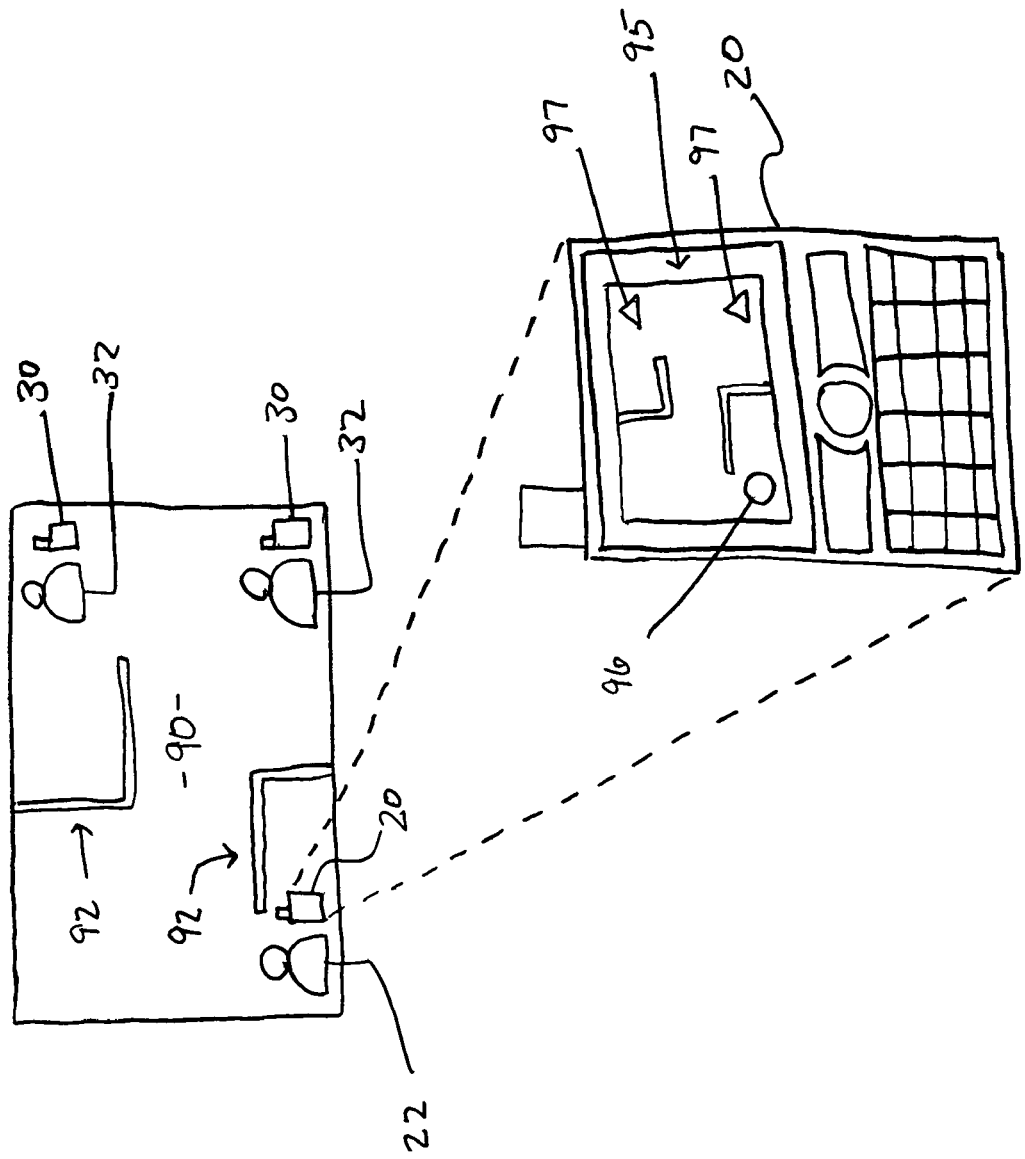
FIG. 5 is a schematic representation of another embodiment of the system and method for enabling interactive wireless communication disclosed in accordance with the present invention.

Furthermore, in at least one embodiment, the present invention is structured to graphically display a map illustrating the user's 22 location as well as the location of any one or more prospective matches disposed in a proximate location. In particular, the method of the present invention may, in at least one embodiment, comprise graphically displaying on the first mobile device 20 the location of one or a plurality of proximately disposed second mobile devices 30. Of course, the second mobile device(s) 30 may also graphically display the location of the first mobile device(s) 20. For exemplary purposes only, and referring now to the schematic representation illustrated in FIG. 5, while in a large room 90 or trade show, at least one embodiment is structured to graphically display a map 95 of the room 90 and/or trade show while indicating the location of the user 22, 32 and/or one or more potential matches thereon via for instance, an icon 96, 97, respectively. Of course any indication or indicia may be used to represent the location of the users 22, 32, and/or the respective mobile devices 20, 30. The walls, tables, chairs, doors, desks, booths, or other structures or devices 92 within the room 90 may also be graphically displayed on the map 95, as illustrated in the expanded view of the first mobile device 20 of FIG. 5.

In addition, an introduction communication channel may be established wherein the users 22, 32 may electronically communicate with one another via limited means, such as, for instance, only e-mail, text message, or live chat. The user's 22, 32 may later decide to establish a full communication channel where digital media can also be communicated.

Furthermore, once a match has been determined, or otherwise once it has been determined that the first and second social interactive pairing criteria 25, 35 coincide with one another, at least one embodiment of the present invention is structured to automatically or upon the user's 22, 32 selective confirmation, establish a communication channel 70 between the first and second mobile devices 20, 30 so as to facilitate communication therebetween, as generally indicated at 110. As such, the user 22 at the first mobile device 20 may communicate with the user 32 at the second mobile device 30 via voice messages, live chatting, text messages, photographs, videos, contact information, electronic mail, and/or any other digital media or communication techniques, and vice-versa.

In addition, the first and second mobile devices 20, 30 may be configured to automatically, or upon the user's selective confirmation, communicate and/or push certain selective digital media, such as photographs, messages, videos, etc. upon the establishment of the communication channel therebetween. The digital media may comprise, but is certainly not limited to MP3, AAC, WMV, MPEF, AVI, MICROSOFT WORD®, MICROSOFT EXCEL®, ADOBE ACROBAT®, PDF, or VCF files. In particular, the pushing of the digital media allows users 22, 32 to communicate with one another via the mobile devices 20, 30 without any human voice one-to-one communication. As such, in at least one embodiment, the mobile devices 20, 30 of at least one embodiment may be at least partially autonomous in connection with establishing a match, and communicating certain media and/or messages.

In yet another embodiment, upon disposition of the first and second mobile devices 20, 30 in a physical and/or geographic proximity to one another, the present invention is structured to query the second mobile device 30 so as to determine whether the first and second interactive pairing criterion 25, 35 coincide with one another. The queries may, in at least one embodiment, occur automatically upon disposition of the mobile devices 20, 30 in a physical proximity to one another and/or upon interactive or selective input from the respective users 22, 32 thereof. In addition, as will be described below, at least one embodiment may comprise a series of successive queries to the first and/or second mobile devices 20, 30.

In particular, as identified above, the first social interactive pairing criteria 25 and/or the prospective match information of the present invention may comprise a plurality of selective characteristics, such as female, blonde hair, blue eyes, 5'5", living in Miami, Fla. Further, the prospective match information may be compound and may include the following, for example: a female with blonde or brown hair, and living in Miami, Fla.; if blonde hair, then blue eyes, but if brown hair, then brown eyes.

As identified above, in at least one embodiment, the present invention is structured to query the second mobile device 30 to determine if the first and second social interactive pairing criteria 25, 35 coincide with one another, or otherwise determine if the selective characteristics associated with the first mobile device 20 coincide with the profile of the second mobile device 30. Accordingly, upon disposition of the devices 20, 30 in a proximate relation with one another, the first device 20 and/or the server 60 of at least one embodiment is structured to query the second mobile device 30, wherein the user 32 may selectively respond. However, it is contemplated that, in at least one embodiment, the second mobile device 30 may automatically respond with or without the user's 32 knowledge based upon, for example, the user's 32 pre-established profile.

For instance, the second mobile device 30 may be asked male or female? Using the example identified above, if the second mobile device 30 responds with "male", the query session ends as there is no match. However, if the second mobile device 30 responds with "female," at least one embodiment of the present invention is structured to provide a series of successive queries, and may thus ask a follow-up question, such as, what is your hair color? Again using the example above, if the response is "red" the query session ends. However, "blonde" or "brown" will continue the series of successive queries.

In yet another embodiment of the present invention, the interactive social network 40 comprises one or more social networking websites 80 accessible via an interactive computer network 50. Specifically, in at least one embodiment, the interactive computer network 50, as used herein, may generally refer to a collection of computer networks commonly known as the World Wide Web. Specifically, the World Wide Web represents a collection of computer networks cooperatively connected to each other and accessed by virtue of the Internet Protocol or other like protocols. It is contemplated, however, that the interactive computer network 50 may include virtually any computer network, such as, for example, a Wide Area Network ("WAN"), Local Area Network ("LAN"), Intranet, peer-to-peer network ("P2P"), Blue Tooth network, mobile network, etc.

In addition, the one or more social networking websites 80 may comprise, for example, MYSPACE®, FACEBOOK®, LINKEDIN®, etc. Accordingly, synchronizing the first mobile device 20 and the second mobile device 30 with an interactive social network 40, as represented at 102, may, in at least one embodiment, comprise virtually linking the mobile devices 20, 30 with a social networking website 80 such as MYSPACE®, FACRBOOK®, or LINKEDIN®. Specifically, in at least one embodiment, the first mobile device 20 is linked with a first profile 82 associated with the social networking website 80 and the second mobile device 30 is linked with a second profile 84 associated with the same social networking website 80. Upon doing so, in at least one embodiment, the first and second profiles 82, 84 of the social networking website 80, and/or an identification of the "contacts" or "friends" associated therewith, is downloaded or saved to the respective mobile device 20, 30 and/or the server 60. However, in at least one embodiment, the mobile devices 20, 30 and/or server 60 may be structured, configured, and authorized to access in real-time the associated social networking website profile 82, 84 so as to compare the corresponding "contacts" and/or "friends" with other mobile devices 20, 30, as explained below.

For instance, a member or profile 82, 84 of the social networking website 80 may include or otherwise be associated with one or more "contacts" and/or "friends." The "contacts" and/or "friends" are generally other members of the same social networking website 80. Moreover, in at least one embodiment of the present invention, the user 22 of the first mobile device 20 is associated with the first profile 82 of the social networking website 80, and thus the "contacts" or "friends" thereof are those of the user 22. Similarly, the user 32 of second device 30 is associated with the second profile 84 of the social networking website 80, and thus the "contacts" or "friends" thereof are those of the user 32. As such, in at least one embodiment of the present invention, the first social interactive pairing criterion 25 comprises an identification of at least one social contact or friend associated with the first profile 82 of the social networking website 80. Similarly, the second social interactive pairing criterion 35 of at least one embodiment comprises an identification of at least one social contact associated with the second profile 84 of the social networking website 80.

Figure 4:
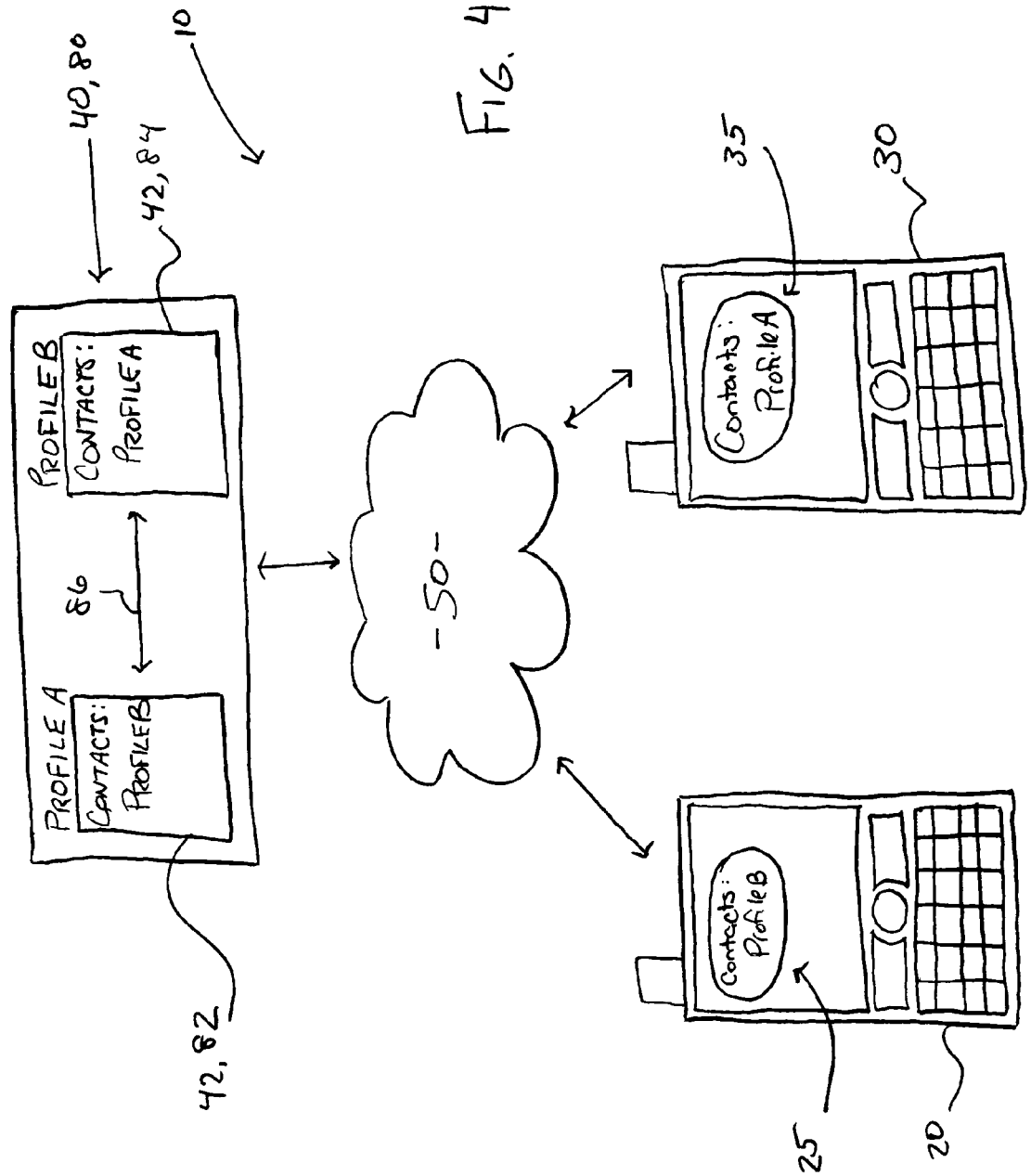
FIG. 4 is a schematic representation of yet another embodiment of the system for enabling social interactive wireless communication as disclosed in accordance with the present invention.

Thus, in such an embodiment, if the first profile 82 and the second profile 84 are in fact virtually connected with one another via the social networking website 80, upon disposition of the first and second mobile devices 20, 30 in a physical and/or geographic proximity to one another, at least one embodiment of the present invention is structured to dispose the mobile devices 20, 30 in a communicative relation with one another, or otherwise notify the users 22, 32 thereof of each other's presence. In particular, the first and second profiles 82, 84 are said to be virtually connected with one another if the first and second profiles 82, 84 are "contacts" or "friends" with one another within the social networking website, as schematically illustrated as 86 in FIG. 4.

Furthermore, as presented below, the following are mere illustrative examples of the present invention in accordance with the detailed description of the various embodiments disclosed herein. For instance, a user 22 may walk into a meeting room and instruct his/her mobile device 20 to search for other users 32 who are on a pre-established "friend" or "contact" list associated with a particular social networking website, such as MYSPACE®. The user's 22 mobile device 20 may receive communications from a social networking server 60 that another individual who is identified on the "friend" or "contact" list is in a geographic proximity to the user 22, for instance, within the same meeting room. Both users 22, 32 are advised of each other's presence via communication from the server 60 and may selectively choose to communicate with one another in virtually any manner, such as, walking over to each other, instant messaging, telephone, or e-mail.

In yet another illustrative example of the present invention, a user 22 is at a party and desires to selectively advise other individuals that he or she is there. The user 22 may push or communicate to the server 60 via the first mobile device 20 that he/she is at the party and also indicate certain prospective match information directly on the mobile device 20 in real-time. The user 22 may update or modify the prospective match information or any profile information at any time via the mobile device 20, itself, and without the need to access a separate computer or server 60.

In a further illustrative example, a user 22 is at a trade show and desired to transmit his electronic business card, for instance in a .vcf format, or other digital media or data to other individuals who are interested in receiving it. The user 22 may then instruct the mobile device 20 to push his or her location to the server 60, and the server 60 may thereafter search for other users or mobile devices 30 disposed in a geographic proximity who are interested in receiving the user's 22 electronic business card. If so, the server 60 may send the information to such individuals or mobile devices 30.

As another illustrative example, a user 22 is at a function and desires to meet another individual who is a member of the same affinity group. The affinity group may include, for example, a military group, the U.S. Air Force, a school, an online community, a common interest group, a member of a particular company, charity, or sports group, etc. The user 22 may instruct his mobile device 20 to push his geographic location and an identification of his affinity group to the server 60. The server 60 is then structured to locate any other individuals in a geographic proximity who are members of the same or similar affinity group.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A computer-implemented method for enabling interactive wireless communication between at least two mobile devices, the method comprising:

affiliating at least one first mobile device and at least one second mobile device with an interactive network comprising a plurality of members associated therewith, associating at least one first interactive pairing criterion with the first mobile device, wherein the first interactive pairing criterion corresponds to at least one prospective wireless match, associating at least one second interactive pairing criterion with a second mobile device, determining whether the first and second interactive pairing criterion at least partially coincide with one another upon determining, using at least one global positioning system, the first and second mobile devices are disposed in a geographic proximity to one another, establishing a communication channel between the first mobile device and the second mobile device for communication therebetween; and upon disposition of the first and second mobile devices in the geographic proximity to one another, automatically querying the second mobile device to determine whether the first and second interactive pairing criterion coincide with one another;

providing a series of successive automatic queries to the second mobile device to determine whether the first and second interactive pairing criterion coincide with one another upon disposition of the first and second mobile devices in a geographic proximity to one another; and graphically displaying on the first mobile device a location of a plurality of second mobile devices disposed in a proximate relation thereto.

2. The method as recited in claim 1 further comprising synchronizing the first mobile device and the second mobile device with the interactive network.

3. The method as recited in claim 2 wherein synchronizing the first and second mobile devices with the interactive network comprises virtually linking the first mobile device with a first profile associated with the interactive network, and virtually linking the second mobile device with a second profile associated with the interactive network.

4. The method as recited in claim 3 further comprising associating a user of the first mobile device with the first profile, and associating a user of the second mobile device with the second profile.

5. The method as recited in claim 1 wherein the first interactive pairing criterion includes at least one selective characteristic of a user associated with the prospective wireless match.

6. The method as recited in claim 5 wherein the second interactive pairing criterion includes a pre-established profile.

7. The method as recited in claim 6 further comprising determining whether the at least one selective characteristic associated with the first mobile device coincides with the pre-established profile associated with the second mobile device.

8. The method as recited in claim 7 wherein the at least one selective characteristic associated with the first mobile device includes at least one physical characteristic of the user associated with the prospective wireless match.

9. The method as recited in claim 7 further comprising communicating the pre-established profile associated with the second mobile device to the first mobile device upon the determination that the at least one selective characteristic and the pre-established profile coincide with one another.

10. The method as recited in claim 9 further comprising establishing a communication channel between the first mobile device and the second mobile device upon selective confirmation via a user at the first mobile device and a user at the second mobile device.

11. The method as recited in claim 10 further comprising defining the communication channel as comprising direct communication between the first mobile device and the second mobile device.

12. The method as recited in claim 9 further comprising establishing the communication channel between the first mobile device and the second mobile device via a peer-to-peer network.

13. The method as recited in claim 1 further comprising communicating digital media between the first and second mobile devices.

14. The method as recited in claim 1 further comprising determining whether the first and second interactive pairing criterion coincide with one another via direct peer-to-peer communication therebetween.

15. The method as recited in claim 1 further comprising establishing at least one communication channel between the first mobile device and a plurality of second mobile devices for communication between the first mobile device and each of the plurality of second mobile devices.

16. A computer-implemented method for enabling interactive wireless communication between at least two mobile devices, the method comprising:
    affiliating at least one first mobile device and at least one second mobile device with an interactive network comprising a plurality of members associated therewith,
    associating a first interactive pairing criterion with the first mobile device, the first interactive pairing criterion corresponds to at least one prospective wireless match,
    associating a second interactive pairing criterion with a second mobile device,
    determining, using at least one global positioning system, that the first and second mobile devices are disposed in a geographic proximity to one another,
    upon disposition of the first and second mobile devices in the geographic proximity to one another, providing a series of successive automatic queries to the second mobile device to determine whether the first and second interactive pairing criterion at least partially coincide with one another,
    causing, on the first mobile device, a location of a plurality of second mobile devices disposed in a proximate relation to the first mobile device to be graphically displayed, and
    causing a communication channel to be established between the first mobile device and the second mobile device for communication therebetween, wherein
    the first mobile device is virtually linked with a first profile associated with the interactive network,
    the second mobile device is virtually linked with a second profile associated with the interactive network, and
    the interactive network comprises a social networking website accessible via the interactive computer network.

17. The method as recited in claim 16 wherein the first interactive pairing criterion includes an identification of at least one social contact associated with the first profile.

18. The method as recited in claim 17 wherein the second interactive pairing criterion includes an identification of at least one social contact associated with the second profile.

19. The method as recited in claim 18 further comprising determining whether the first profile is virtually connected with the second profile via the social networking website.

20. The method as recited in claim 19 further comprising defining the first profile as being virtually connected with the second profile via the social networking website upon
    the identification of at least one social contact associated with the first profile corresponds to the second profile, and
    the identification of at least one social contact associated with the second profile corresponds to the first profile.

21. A method for enabling social interactive wireless communication between at least two mobile devices, the method comprising:
    synchronizing a first mobile device and a second mobile device with an interactive social network,
    associating at least one selective characteristic with the first mobile device, wherein the at least one selective characteristic corresponds to at least one prospective wireless match,
    associating at least one pre-established profile with a second mobile device, upon determining, using at least one global positioning system, the first and second mobile devices are disposed in a geographic proximity to one another,
    upon disposition of the first and second mobile devices in the geographic proximity to one another, providing a series of successive automatic queries to the second mobile device to determine whether the at least one selective characteristic associated with the first mobile device and the pre-established profile associated with the second mobile device coincide with one another,
    establishing a communication channel between the first mobile device and the second mobile device for direct communication therebetween; and
    graphically displaying, on the first mobile device, a location of a plurality of second mobile devices disposed in a proximate relation to the first mobile device.

22. The method as recited in claim 21 further comprising updating the at least one selective characteristic in real-time via the first mobile device.

23. The method as recited in claim 21 further comprising updating the pre-established profile associated with the second mobile device in real-time via the second mobile device.

24. The method as recited in claim 21 further comprising defining the at least one selective characteristic associated with the first mobile device as comprising at least one physical characteristic associated with a prospective wireless match.

* * * * *